US010359234B2

(12) United States Patent
Robbin

(10) Patent No.: US 10,359,234 B2
(45) Date of Patent: Jul. 23, 2019

(54) TEMPERATURE CONTROL DEVICE FOR CONTROLLING THE TEMPERATURE OF WORKPIECES

(71) Applicant: EISENMANN SE, Boeblingen (DE)

(72) Inventor: Joerg Robbin, Ammerbuch-Pfaeffingen (DE)

(73) Assignee: IESENMANN SE, Boeblingen (DE)

( * ) Notice: Subject to any disclaimer, the term of this patent is extended or adjusted under 35 U.S.C. 154(b) by 0 days.

(21) Appl. No.: 15/570,788

(22) PCT Filed: Apr. 27, 2016

(86) PCT No.: PCT/EP2016/000677
§ 371 (c)(1),
(2) Date: Oct. 31, 2017

(87) PCT Pub. No.: WO2016/180516
PCT Pub. Date: Nov. 17, 2016

(65) Prior Publication Data
US 2018/0120028 A1     May 3, 2018

(30) Foreign Application Priority Data

May 9, 2015 (DE) .......... 10 2015 006 098

(51) Int. Cl.
*B65G 35/06* (2006.01)
*F26B 15/16* (2006.01)
(Continued)

(52) U.S. Cl.
CPC .......... *F26B 15/16* (2013.01); *B05B 13/0221* (2013.01); *B05B 16/20* (2018.02);
(Continued)

(58) Field of Classification Search
USPC ............................... 198/339.1; 104/161, 305
See application file for complete search history.

(56) References Cited

U.S. PATENT DOCUMENTS 3,556,013 A * 1/1971 Kruer .................. B61C 5/00
104/157
3,591,023 A * 7/1971 Allen .................... B63B 25/004
414/140.1
(Continued)

FOREIGN PATENT DOCUMENTS

DE   10 2004 023 536 A1   3/2005
DE   10 2005 012 508 A1   10/2006
(Continued)

*Primary Examiner* — Joseph A Dillon, Jr.
(74) *Attorney, Agent, or Firm* — Schroeder INtellectual Property Law Group, LLC

(57) ABSTRACT

A temperature control device for controlling the temperature of workpieces in particular for drying vehicle bodies, having a housing and a temperature control tunnel accommodated in the housing and having a tunnel floor. A transport system includes a plurality of transport carriages, which can be moved in a transport direction on a rail system, and by means of which the workpieces can be transported through the temperature control tunnel. Each transport carriage has a transport carriage chassis and a securing device for at least one workpiece, which are coupled together by means of a connection device. Each transport carriage carries a separate drive system, so that the transport carriages can be driven and moved independently of one another.

10 Claims, 9 Drawing Sheets

(51) Int. Cl.
- *B05B 13/02* (2006.01)
- *B62D 65/18* (2006.01)
- *F26B 21/00* (2006.01)
- *B05B 16/20* (2018.01)
- *F26B 3/04* (2006.01)
- *B05C 9/14* (2006.01)
- *F26B 25/00* (2006.01)

(52) U.S. Cl.
CPC ............... *B62D 65/18* (2013.01); *F26B 3/04* (2013.01); *F26B 21/00* (2013.01); *B05C 9/14* (2013.01); *F26B 25/003* (2013.01); *F26B 2210/12* (2013.01)

(56) References Cited

U.S. PATENT DOCUMENTS

| | | | | |
|---|---|---|---|---|
| 3,599,650 A | * | 8/1971 | Abraham | B60S 3/04 134/123 |
| 4,039,075 A | * | 8/1977 | Gray | B60S 3/004 104/162 |
| 4,787,804 A | * | 11/1988 | Edenas | B65G 1/0407 414/254 |
| 4,794,863 A | * | 1/1989 | Gates | B65G 25/02 101/165 |
| 4,924,996 A | * | 5/1990 | Svensson | B05B 15/62 198/341.05 |
| 5,432,974 A | * | 7/1995 | Yasutake | B60S 3/002 134/123 |
| 5,845,582 A | * | 12/1998 | Coester | B61B 13/122 104/156 |
| 5,979,334 A | * | 11/1999 | Lund | B61B 13/00 104/130.07 |
| 6,129,025 A | * | 10/2000 | Minakami | B60L 5/005 104/88.01 |
| 6,494,304 B1 | * | 12/2002 | Jaynes | B61B 10/025 104/172.1 |
| 6,664,667 B2 | * | 12/2003 | Mayer | B25J 5/02 310/12.11 |
| 7,337,791 B1 | * | 3/2008 | Belanger | B60S 3/04 134/123 |
| RE40,463 E | * | 8/2008 | Belanger | B60S 3/06 134/123 |
| 7,438,075 B1 | * | 10/2008 | Huntington | B60S 3/04 134/123 |
| 8,327,667 B2 | * | 12/2012 | Balduin | C03B 23/0252 65/106 |
| 8,413,669 B2 | * | 4/2013 | Barreyre | B60S 3/004 134/124 |
| 8,474,594 B2 | * | 7/2013 | Robbin | B62D 65/18 198/345.3 |
| 9,650,218 B1 | * | 5/2017 | Stephenson | B65G 69/20 |
| 9,688,478 B2 | | 6/2017 | Robbin | |
| 2006/0054049 A1 | | 3/2006 | Cho | |
| 2008/0251354 A1 | * | 10/2008 | Ruggaber | B62D 65/18 198/463.1 |
| 2008/0264755 A1 | | 10/2008 | Kobs et al. | |
| 2009/0106999 A1 | | 4/2009 | Swoboda | |
| 2009/0272409 A1 | * | 11/2009 | Petit | B60S 3/002 134/32 |
| 2013/0199893 A1 | * | 8/2013 | Robbin | B05B 13/0221 198/463.1 |
| 2017/0190514 A1 | * | 7/2017 | Weiss | B61B 13/125 |

FOREIGN PATENT DOCUMENTS

| | | |
|---|---|---|
| DE | 10 2005 047 530 A1 | 4/2007 |
| DE | 10 2006 010 688 A1 | 9/2007 |
| DE | 10 2010 045 010 A1 | 3/2012 |
| WO | 2006/097219 A1 | 9/2006 |

* cited by examiner

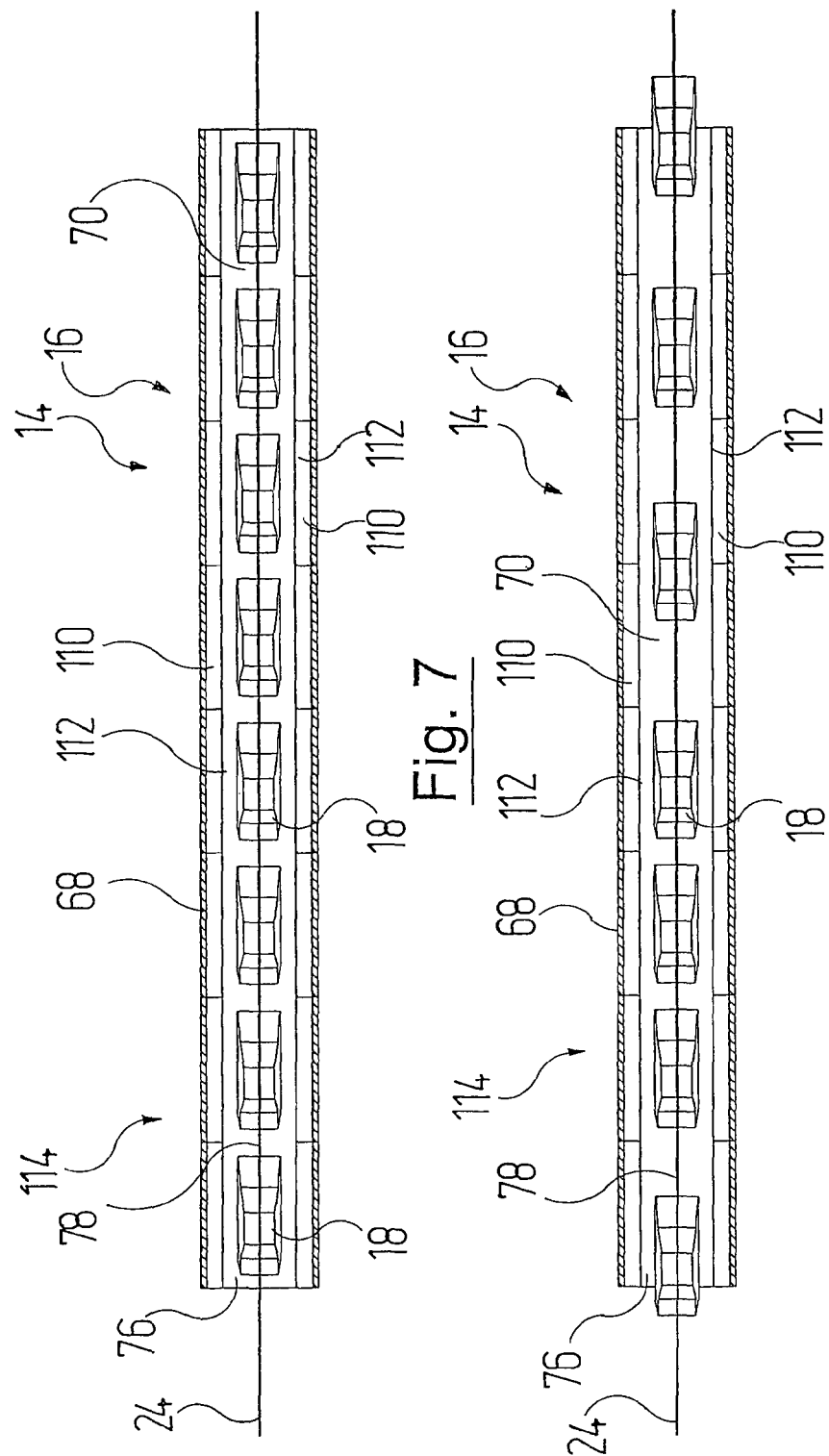

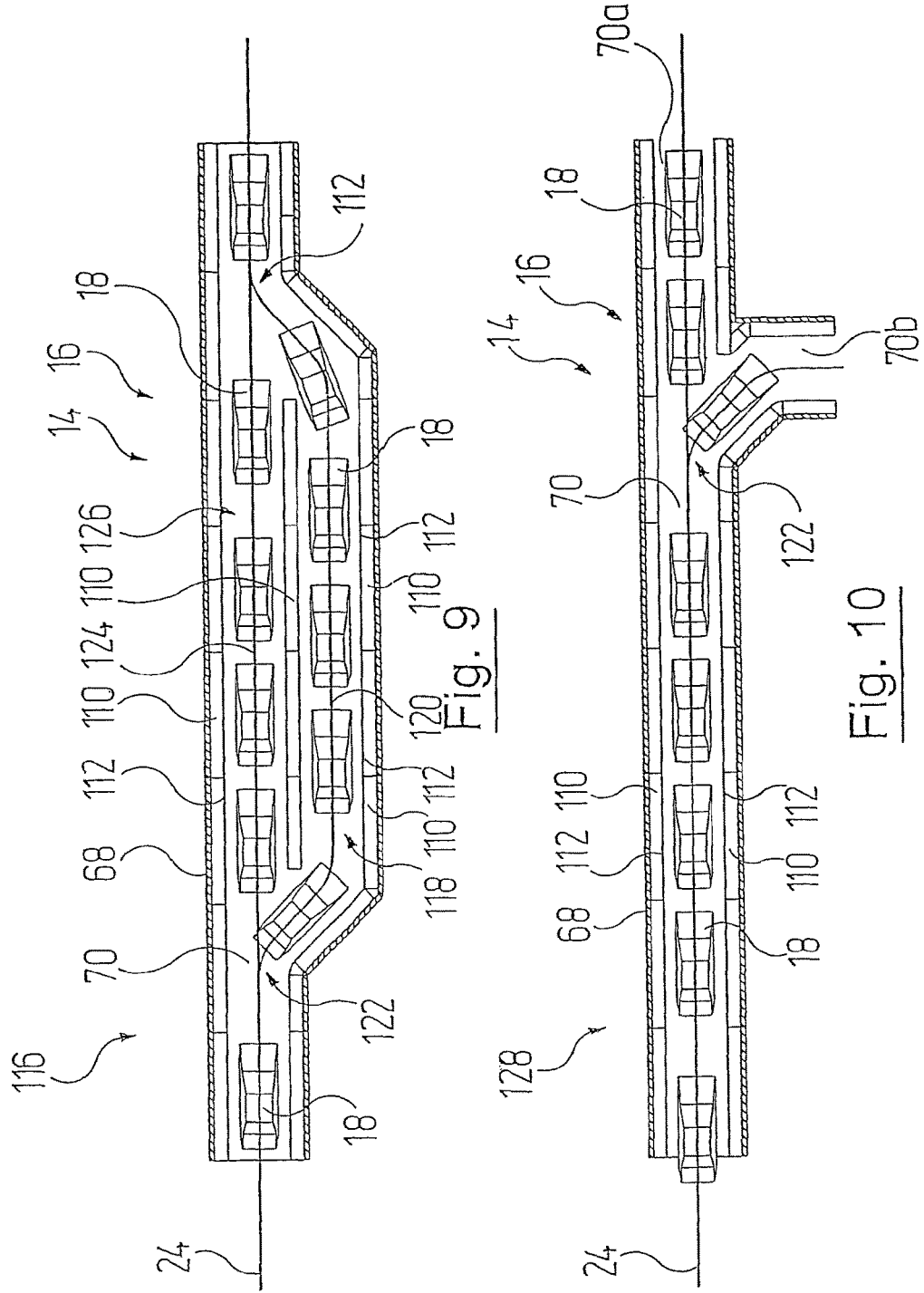

TEMPERATURE CONTROL DEVICE FOR CONTROLLING THE TEMPERATURE OF WORKPIECES

RELATED APPLICATIONS

This application is a national phase of International Patent Application No. PCT/EP2016/000677 filed Apr. 27, 2016, which claims the filing benefit of German Patent Application No. 10 2015 006 098.8 filed May 9, 2015, the contents of both of which are incorporated herein by reference.

FIELD OF THE INVENTION

The invention relates to a temperature control device for controlling the temperature of workpieces, in particular for drying vehicle bodies, having
a) a housing;
b) a temperature control tunnel which is accommodated in the housing and has a tunnel floor;
c) a transport system, which comprises a plurality of transport carriages, which can be moved in a transport direction on a rail system and by means of which the workpieces can be transported through the temperature control tunnel, wherein each transport carriage comprises a transport-carriage chassis and a securing device for at least one workpiece, which are coupled to one another by a connecting device.

BACKGROUND OF THE INVENTION

When referring to "controlling the temperature" of a workpiece here, this means bringing about a particular temperature of the workpiece which it is not at initially. This can relate to an increase in temperature or a decrease in temperature.

In the automobile industry, a frequent instance of controlling the temperature of workpieces, namely heating workpieces, and in particular vehicle bodies, is the procedure of drying the coating of a vehicle body. This can be for example a paint or an adhesive or the like. The following description of the invention in detail is based on the example of such a dryer.

In commercially known temperature control devices or dryers which are operated in throughput mode, the transport carriages are coupled to a central drive system, for example a chain pull or the like. All the workpieces here are moved in the same way in a clocked or a continuous manner and the dwell time in the temperature control tunnel is the same for all workpieces.

However, it may be that varying temperature controls ought to, or have to, be realized for difficult workpieces, wherein the temperatures and/or the dwell times for the workpieces in the tunnel atmosphere can be different. However, in such a temperature control device, varying requirements of this type can only be implemented with difficulty. In varying treatments for two workpieces conveyed in succession through the temperature control tunnel.

SUMMARY OF THE INVENTION

An object of the invention, therefore, is to provide a temperature control device of the type mentioned at the outset, which takes these considerations into account.

This object may be achieved by a temperature control device of the type mentioned at the outset wherein d) the transport carriages each carry along a separate drive system so that the transport carriages can be driven and moved independently of one another.

Two workpieces to be conveyed in succession through the temperature control tunnel can thus be guided individually through the temperature control device. It is also optionally possible for the workpieces to be easily conveyed in various conveying sections through the temperature control tunnel, which is not readily possible with a central drive system since, for this purpose, the transport carriages have to be uncoupled from a first drive system for a first section and coupled to a second drive system for a second section.

It is particularly favorable here if the tunnel floor has a connecting passage, and a driving space, arranged below the temperature control tunnel, is available for the transport-carriage chassis such that the transport-carriage chassis can be moved in the driving space, wherein the securing device is carried along in the temperature control tunnel and the connecting device extends through the connecting passage. It is thus possible for the drive components, which are sensitive to external influences, to be mounted effectively on the chassis since this can therefore be moved separately from the tunnel atmosphere.

The drive system preferably comprises at least one drive roller, which is supported by the transport-carriage chassis and can roll along a drive running surface of the rail system, and at least one drive motor for the at least one drive roller, which is carried along by the transport-carriage chassis.

In a manner known per se, the transport carriages can essentially be supplied with energy in the driving space via contact lines on the rail system, for which the transport carriages carry along corresponding current collectors.

It is particularly advantageous if the transport carriage carries along a self-sufficient energy supply device by means of which the at least one drive motor can be supplied with energy. It is thus possible to dispense with an installation for energy supply along the rail system. A disruption to the energy supply of a transport carriage is then always restricted to the transport carriage itself, so that such a defective transport carriage, or its energy-supply components, can be replaced without influencing other transport carriages or necessitating work on the rail system. If disruptions to the energy supply occur when the transport carriage is located outside the dryer, the transport carriage can undergo maintenance isolated from the transport section and the further transport carriages, without the conveyor system being adversely affected.

It is particularly favorable here if the self-sufficient energy supply device comprises at least one rechargeable energy store. In particular, batteries or capacitors can be considered for this.

The connecting passage can be linear or angled. If the tunnel atmosphere can flow substantially unhindered from the temperature control tunnel into the driving space, this can place a strain on the chassis of the transport carriages. To prevent this, the angled course is particularly favorable. In this case, a type of labyrinth seal can be formed.

Alternatively or additionally, shielding means may be advantageously provided, by means of which the contact between at least the transport-carriage chassis and the tunnel atmosphere through the connecting passage is at least lessened.

If the transport-carriage chassis comprises a leading unit running in front in the transport direction and a following unit running behind in the transport direction, the system can be formed to negotiate curves if the coupling points are formed by corresponding swivel couplings.

With regard to the ability of the transport carriages to negotiate curves, it can be advantageous if the connecting device comprises at least two vertical jointed struts, which couple the leading unit and the following unit to the securing device.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are described in more detail below with reference to the drawings, which show:

FIG. 7 a schematic plan view of a portion of the dryer through which a plurality of workpieces are transported at equal spacings and at the same speeds;

FIG. 8 a schematic plan view of a portion of the dryer through which a plurality of workpieces are transported at varying spacings and/or at varying speeds;

FIG. 9 a schematic plan view of a portion of the dryer which comprises a primary zone and a secondary zone;

FIG. 10 a schematic plan view of a portion of the dryer which comprises a branch;

DETAILED DESCRIPTION OF THE PRESENT INVENTION

Figure 1:
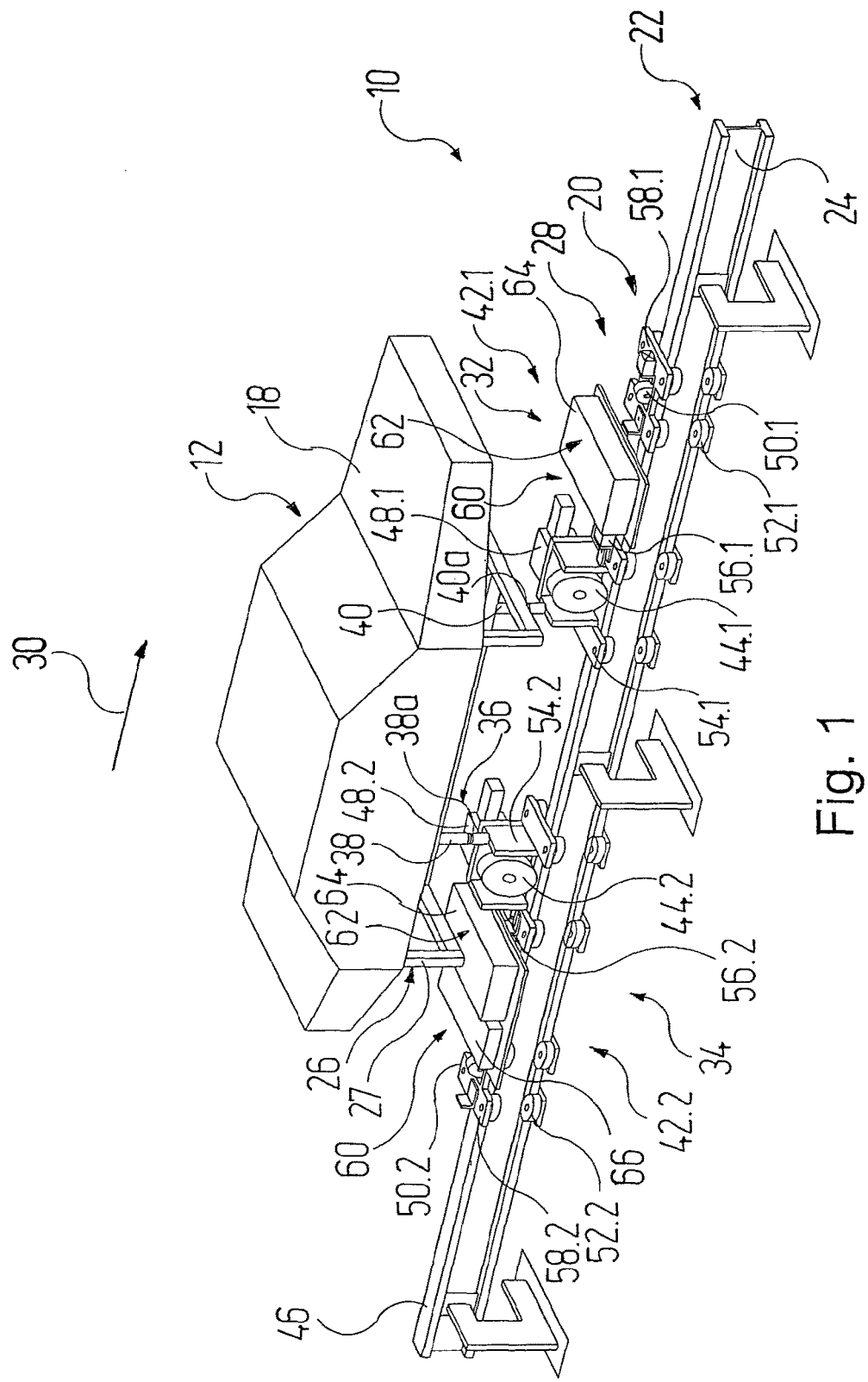
FIG. 1 a perspective view of a transport system for a dryer for drying workpieces, wherein a supporting rail of a rail system having a transport carriage which can be moved thereon is shown, which transport carriage comprises a transport-carriage chassis which is connected to a securing device for workpieces via a connecting device.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is firstly made to FIG. 1, in which 10 denotes a transport system as a whole, with the aid of which workpieces 12 are transported through a temperature control device 14 for controlling the temperature of workpieces 12. A dryer 16 is denoted in general by 16 in FIGS. 2 to 11 as an example of such a temperature control device 14. Vehicle bodies 18 are shown in FIGS. 1 to 5 and 7 to 11 in each case as an example of workpieces 12. However the workpieces 12 can also be other workpieces and, in particular, accessories or fittings for vehicle bodies 18, such as bumpers, wing mirrors or the like. Smaller workpieces 12 can be optionally arranged on a workpiece carrier (not shown specifically).

The transport system 10 comprises a plurality of transport carriages 20, on which the workpieces 12 are transported and which are moved on a rail system 22. The rail system 22 of the transport system 10 comprises a supporting rail 24 on which the transport carriage 20 is moved and which is formed in a manner known per se as an I profile and is anchored to the floor. The thus ground-based supporting rail 24 is single-track. A multi-track, in particular two-track, rail system 22 can alternatively also be present.

The transport carriage 20 comprises a securing device 26 on which a vehicle body 18 or a corresponding workpiece carrier for workpieces 12 can be secured. In the present exemplary embodiment, the securing device 26 is conceived for receiving vehicle bodies 18. To this end, the securing device 26 comprises a supporting profile 27 having bearing bolts (not shown in the figures) which cooperate in a manner known per se with counter-elements on the vehicle body 18 so that the vehicle body 18 can be fixed on the securing device 26. The securing device 26 can also have a plurality of sets of such bearing bolts, which are adapted to various vehicle bodies 18 with different dimensions and designs, so that the securing device 26 can be used flexibly for various vehicle body types.

The securing device 26 therefore receives a vehicle body 18 directly. In another conveying concept, the vehicle body 18 is secured in a manner known per se on a so-called skid, which is then mounted on the securing device 26 together with the vehicle body 18.

The transport carriage 20 comprises a transport-carriage chassis 28, which runs on the supporting rail 24 and supports the securing device 26. In the present exemplary embodiment, the transport-carriage chassis 28 comprises a leading unit 32 running in front in the transport direction 30 and a following unit 34 running behind in the transport direction 30. The transport direction 30 is merely indicated by an arrow in FIG. 1.

The leading unit 32 and the following unit 34, i.e. the transport-carriage chassis 28 in general, are coupled to the securing device 26 via a connecting device 36. The coupling is designed in such a way that the transport carriage 20 is also capable of travelling through curved portions of the supporting rail 24. In the present exemplary embodiment, the connecting device 36 comprises two vertical jointed struts 38 and 40, which couple the leading unit 32 and the following unit 34 to the securing device 26. By means of a joint 38a and 40a, the jointed struts 38, 40 enable the securing device 26 to swivel about a vertical pivot axis with respect to the leading unit 32 and the following unit 34.

The leading unit 32 and the following unit 34 are substantially structurally identical, wherein individual structural parts and components are in a mirrored position on a linear portion of the supporting rail 24 in relation to a plane perpendicular to the transport direction 30. Mutually corresponding structural parts and components of the leading unit 32 and the following unit 34 have the same reference numerals with the indices ".1" and ".2". The leading unit 32 forms a chassis unit 42.1 and the following unit 34 forms a chassis unit 42.2 of the transport-carriage chassis 28 of the transport carriage 20.

The leading unit 32 is now described below: the description of this applies analogously to the following unit 34. The leading unit 32 supports a drive roller 44.1 which rolls along a drive running surface 46 of the supporting rail 24 and is driven by means of a drive motor 48.1, which is carried along by the leading unit 32. In the present exemplary embodiment, the drive running surface 46 of the supporting rail 24 is the surface on the upper side of the I profile and likewise extends accordingly horizontally in horizontal portions of the supporting rail 24. In modifications which are not shown specifically, the drive running surface 46 can also extend for example vertically; in this case, the drive roller 44.1 presses laterally against the supporting rail 22 as a friction wheel.

In general terms, the transport carriages 20 each carry along a separate drive system so that the transport carriages 20 can be driven and moved independently of one another. In the present exemplary embodiment, the separate drive system is formed by the drive rollers 44.1, 44.2 and the associated drive motors 48.1, 48.2.

In addition to the transport carriages 20 described here with the separate drive system, it is also optionally possible for ether transport carriages to be present, which are driven by a central drive system. For example, such a central drive system can be formed by a chain pull or the like. The transport carriages 20 described here can be also be driven and moved accordingly, independently of other drive devices.

To prevent the leading unit 32 from tilting in the transport direction 30, i.e. about a horizontal axis perpendicular to the transport direction 30, the chassis unit 42.1 of the leading unit 32 supports a passive supporting roller 50.1 at a spacing from the drive roller 44.1, which supporting roller likewise rolls along the drive running surface 46 of the supporting rail 22. The chassis unit 42.1 of the leading unit 32 moreover supports a plurality of lateral guide rollers 52.1 (of which only two have a reference sign), which lie against the supporting rail 22 on both sides and thus, in a manner known per se, prevent the leading unit 32 from tilting to the side.

In the present exemplary embodiment, the leading unit 32 comprises a drive frame 54.1 which supports the drive roller 44.1 having the drive motor 48.1 and four guide rollers 52.1 on both sides of the supporting rail 22 in each case. The drive frame 54.1 is connected in a jointed manner via a supporting cross-member 56.1 to a supporting frame 58.1, which in turn supports the supporting roller 50.1 and likewise four guide rollers 52.1 on both sides of the supporting rail 22 in each case. The jointed connection of the drive frame 54.1 to the supporting frame 58.1 is effected via coupling joints (not provided specifically with a reference sign), which form a passage through curved portions of the supporting rail 24.

In the present exemplary embodiment, both the leading unit 32 and the following unit 34 each support a drive roller 44.1 and 44.2 and the respectively associated drive motor 48.1, 48.2. In a modification which is not shown specifically, it can be sufficient for a drive roller 44.1 with a drive motor 48.1 to only be present on the leading unit 32. In any case, the transport-carriage chassis 28 of the transport carriage 20 supports at least one drive roller and carries along the drive motor thereof.

To supply energy to the drive motors 48.1 and 48.2 of the leading unit 32 and the following unit 34, the transport carriage 20 carries along a self-sufficient energy-supply device 60. This refers to an energy supply device which ensures that energy is supplied to the drive motors 48.1, 48.2 in driving mode, i.e. whilst the transport carriage 20 is moving, independently of external energy sources.

In the present exemplary embodiment, the energy supply device 60 is conceived with rechargeable energy stores 62 having at least one energy storage unit 64. An energy storage unit 64 for the respective drive motor 48.1, 48.2 is present here on each chassis unit 42.1, 42.2. A rechargeable energy storage unit 64 for electrical energy can be provided in the form of a battery or a capacitor. In a modification which is not shown specifically, it is also possible to only provide a single energy storage unit for both drive motors 48.1, 48.2. Alternatively, compressed-gas stores can also be present as an energy source for compressed-gas drives.

The following unit 36 moreover supports a control device 66 by means of which the drive motors 48.1, 48.2 can be controlled and synchronized. The control device 66 communicates with a central control (not shown specifically) of the system 10.

Figure 2:
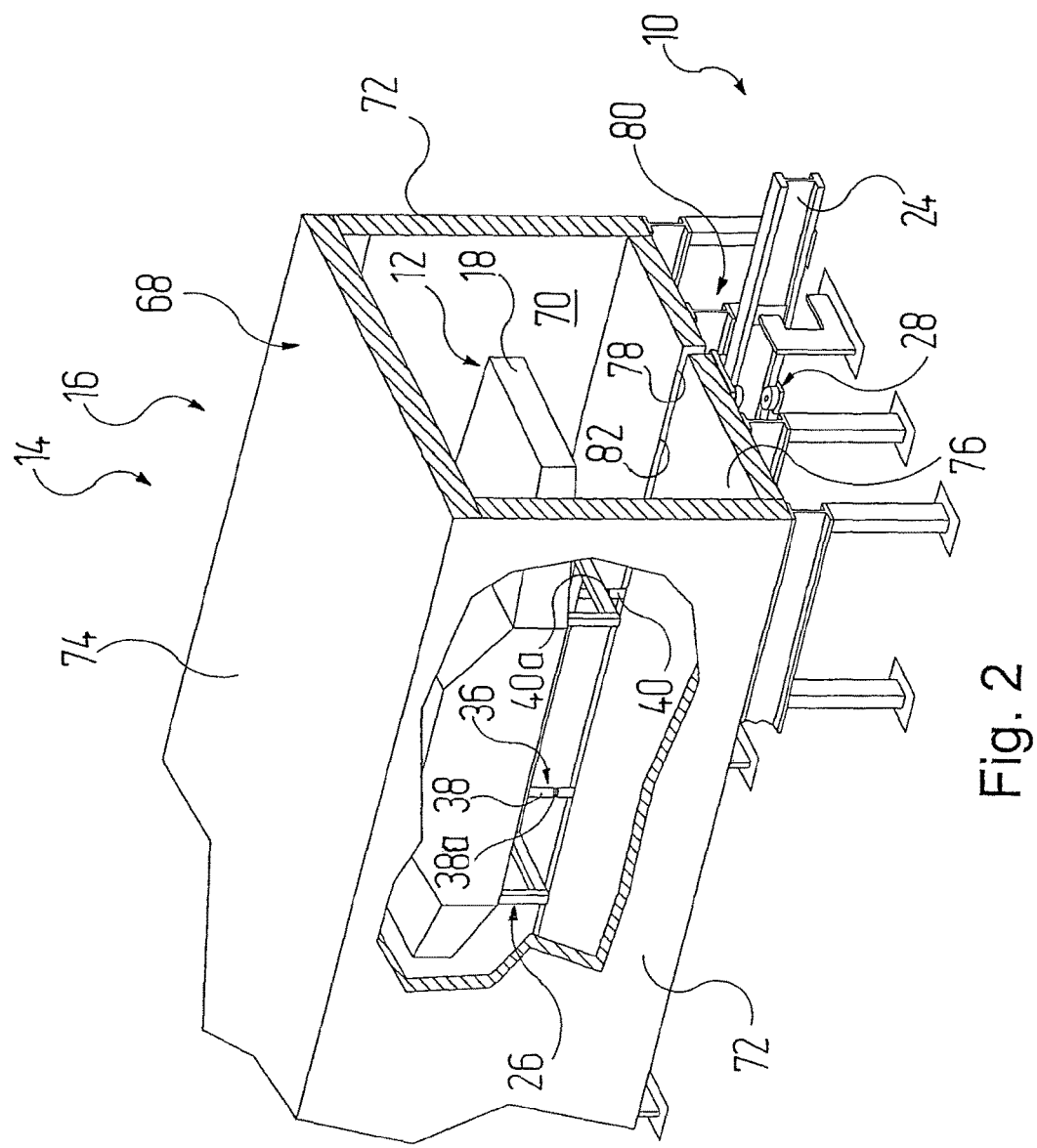
FIG. 2 a perspective view of a portion of a dryer for drying workpieces with the transport system according to FIG. 1, having a drying tunnel, whereof the tunnel floor has a connecting passage which is complementary to the connecting device and leads to a driving space for the transport-carriage chassis, wherein the securing device is arranged in the drying tunnel and the transport-carriage chassis is arranged in the driving space.

As can be seen in FIG. 2, the dryer 16 comprises a housing 68, which delimits a drying tunnel 70 as a temperature control tunnel and comprises side walls 72, a ceiling 74 and a tunnel floor 76. The tunnel floor 76 has a connecting passage 78 which is complementary to the connecting device 36 of the transport carriage 20 and leads to a driving space 80 for the transport-carriage chassis 28, which is arranged below the drying tunnel 70 and in which the rail system 22 is accommodated.

The driving space 80 can be open to the environment of the dryer 16; in any case a separate housing does not have to be present for the driving space 80. In a modification which is not shown specifically, the driving space 80 is delimited by a housing. Alternatively, the side walls 72 of the housing 68 can also extend downwards beyond the tunnel floor 76 so that they delimit the driving space 80 laterally.

When a transport carriage 20 loaded with a workpiece 12 moves into the dryer 16, the connecting device 36 of the transport carriage 20 is therefore threaded, as it were, into the connecting passage 78 of the tunnel floor 76. If the workpieces 12 are then conveyed through the drying tunnel 70, the transport-carriage chassis 28 moves in the driving space 80 and carries along the securing device 26 in the drying tunnel 70, wherein the connecting device 36, i.e. the jointed struts 38 and 40 in the present exemplary embodiment, extends through the connecting passage 78 in the tunnel floor 76.

Figure 3:
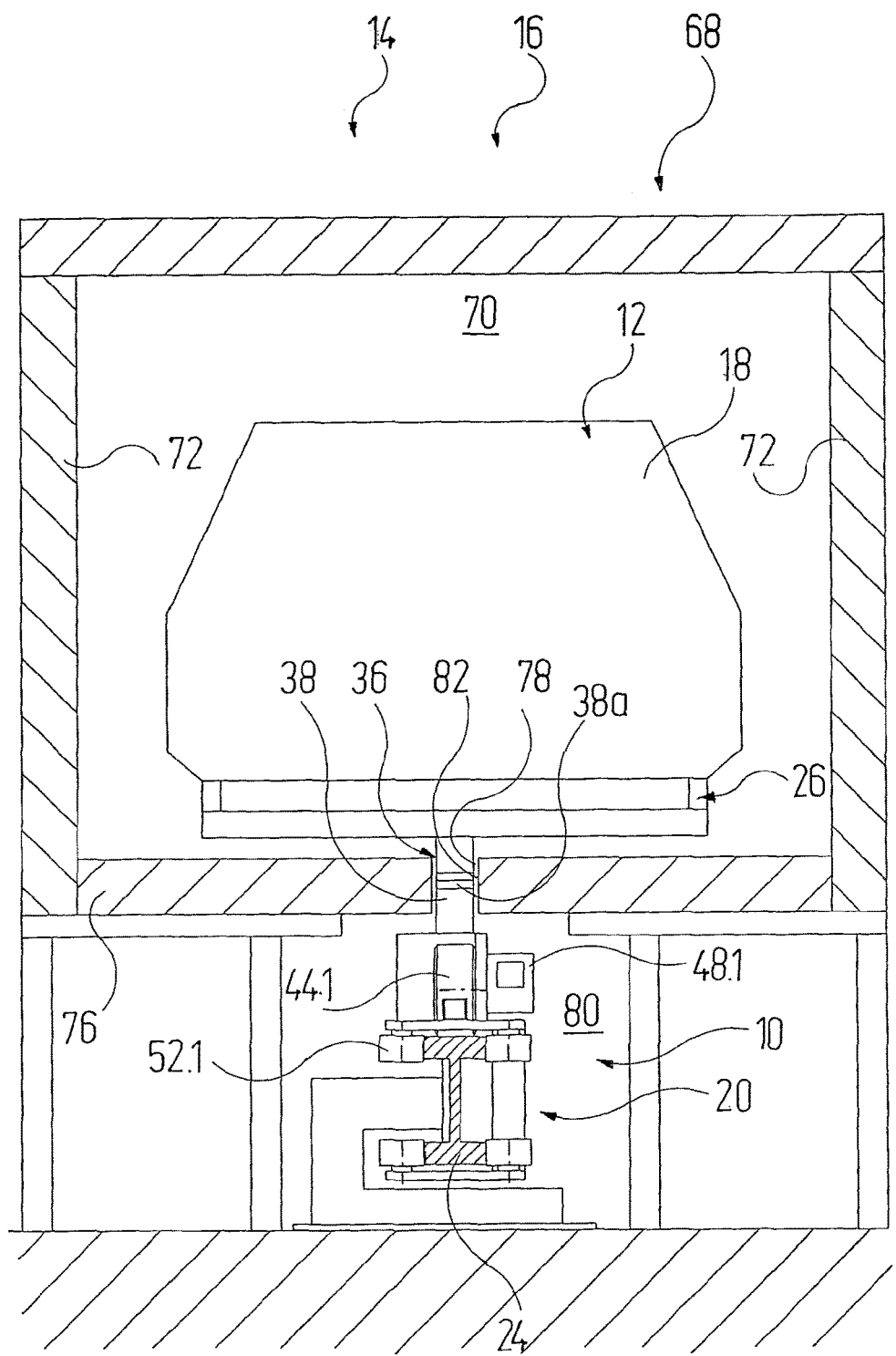
FIG. 3 a cross section of the dryer according to FIG. 2.

As can be seen in particular in FIG. 3, the connecting passage 78 in the present exemplary embodiment is formed as a vertical through slot 82 to match the vertically extending jointed struts 38, 40. In this case, with corresponding flow conditions, the tunnel atmosphere can flow substantially unhindered from the drying tunnel 70, through the connecting passage 78, downwards into the driving space 80.

Figure 4:
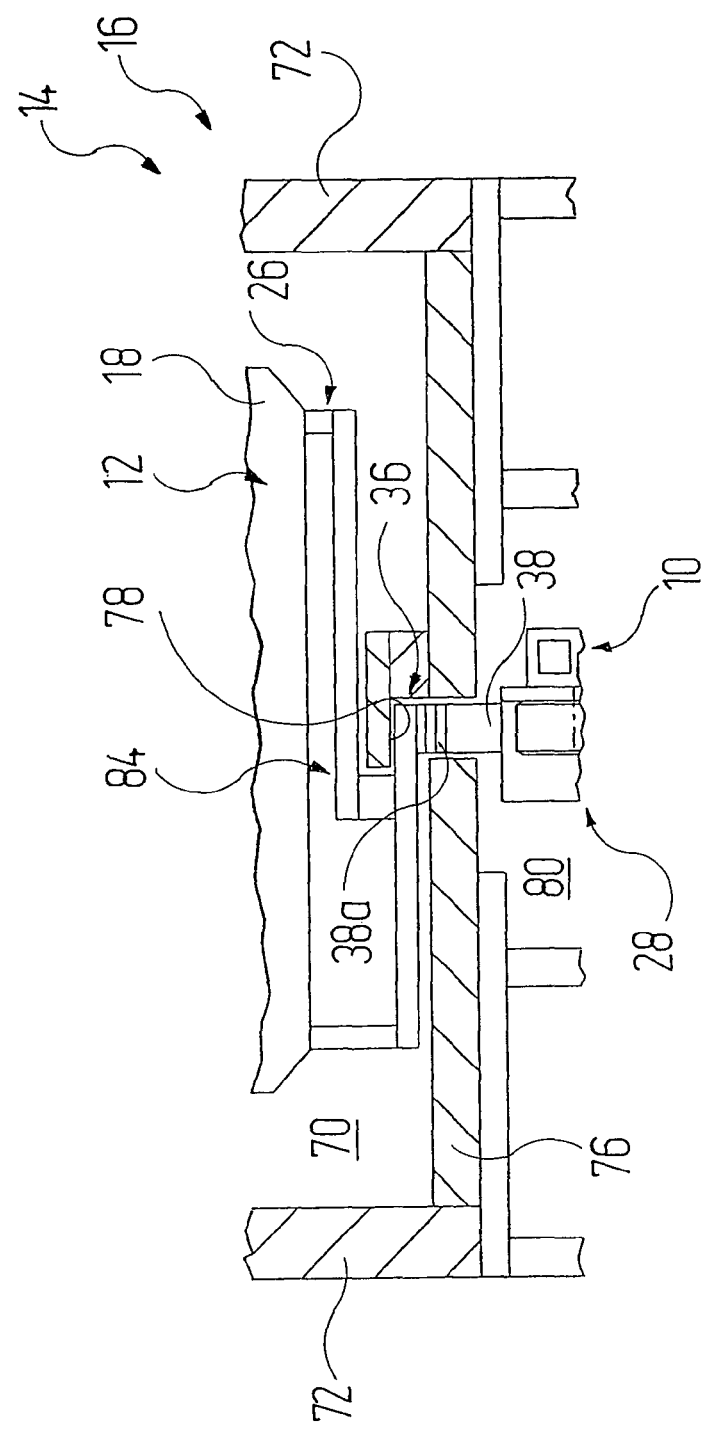
FIG. 4 a detailed section of a modified connecting device with a connecting passage which is complementary thereto.
Figure 5:
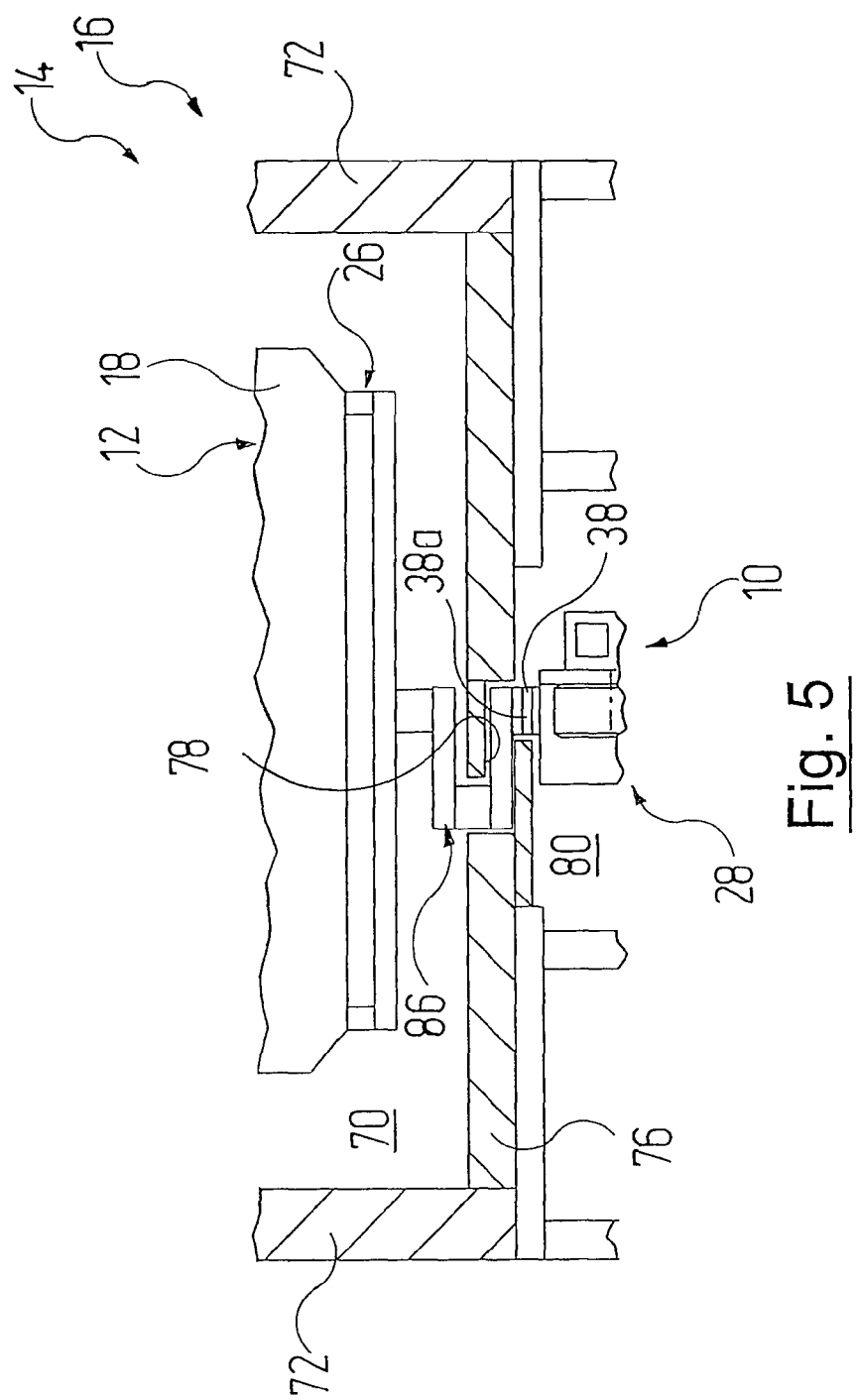
FIG. 5 a detailed section of a connecting device, which is again modified, with a connecting passage which is complementary thereto.
Figure 6:
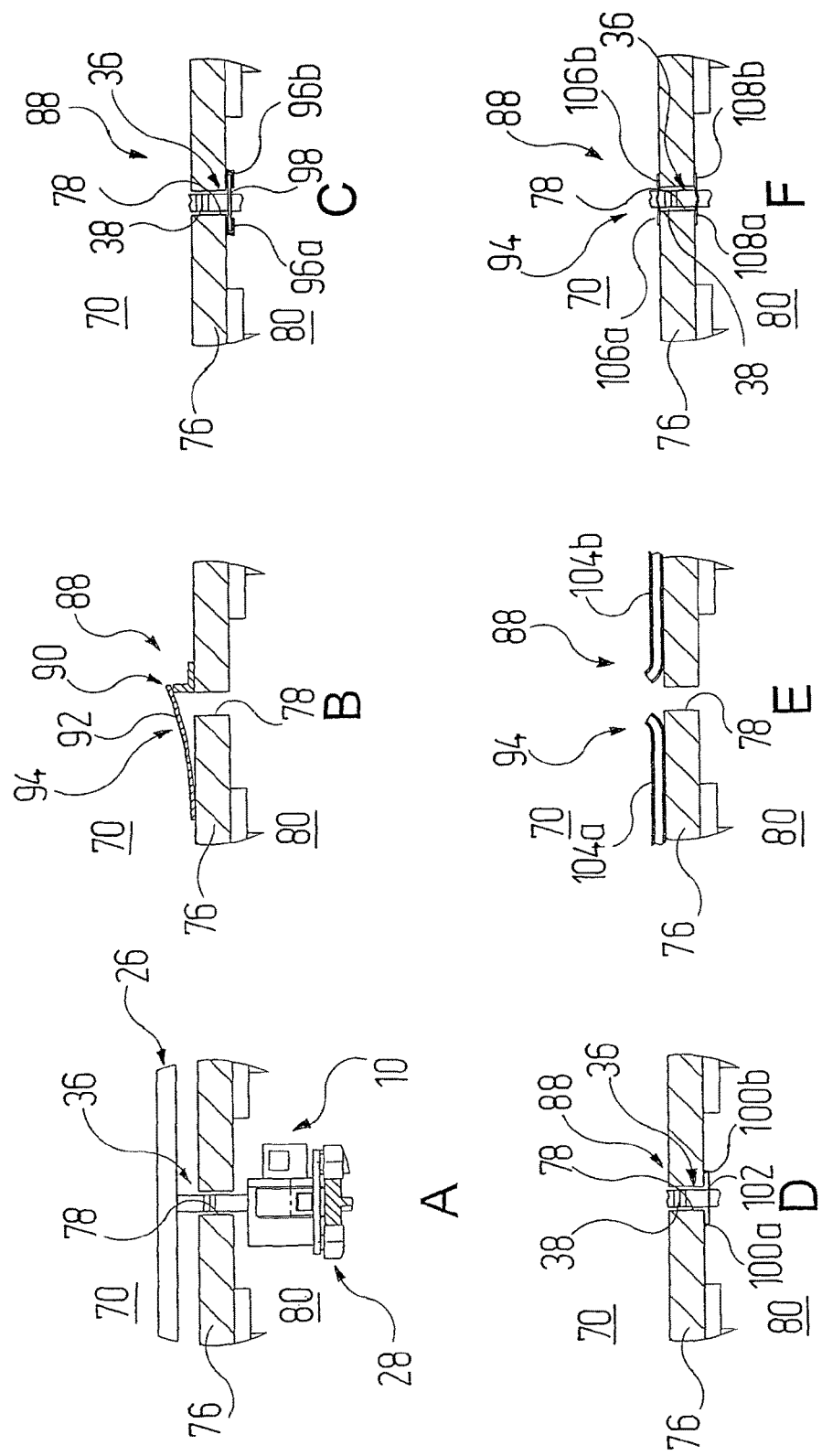
FIG. 6A a detailed section of the connecting device and the connecting portion according to FIGS. 2 and 3.
FIGS. 6B to 6F detailed sections corresponding to FIG. 6A with different shielding means.

To at least make it more difficult for the tunnel atmosphere to flow out of the drying tunnel 70 in this way, the connecting passage 78 can be modified to form a type of labyrinth seal, for example in the manner illustrated in FIGS. 4 and 5.

In the exemplary embodiment shown in FIG. 4, the connecting passage 78 is not linear and does not open to the drying tunnel in the upward direction. Instead, the connecting passage 78 has a course which is angled once in cross section, so that it is open to the drying tunnel 70 laterally. The securing device 26 and the connecting device 36 of the transport carriage 20 are now adapted to one another in such a way that the securing device 26 can encompass the connecting passage 78, as it were. To this end, the supporting profile 27 of the securing device 26 is formed asymmetrically according to the longitudinal center plane, as illustrated in FIG. 4 through the reference sign 84. In the exemplary embodiment shown in FIG. 5, the connecting passage 78 has a course which is angled twice. The jointed struts 38, 40 here comprise a C-shaped portion 86 above their joints 38a and 40a, which follows the course of the connecting passage 78.

In the variants shown in FIGS. 1 to 5, heat can be radiated from the drying tunnel 70, through the connecting passage 78, downwards into the driving space 80 and onto a transport-carriage chassis 28 located there. This can place a strain in particular on the drive motors 48 of the transport carriages 20. With unfavorable flow conditions, hot and possibly aggressive tunnel atmosphere can also arrive in the driving space 80 through the connecting passage 78. It is therefore additionally possible to provide shielding means 88 with which the contact between at least the transport-carriage chassis 28 and the tunnel atmosphere through the connecting passage 78 can at least be lessened. The flow of atmosphere from the driving space 80 into the drying tunnel 70 can likewise be reduced in order to maintain a stable atmosphere in the drying tunnel 70. This is described with reference to exemplary embodiments of shielding means 88 in the case of the linear connecting passage 78 according to FIGS. 1 to 3.

FIG. 6A again shows this linear connecting passage 78 with the transport carriage 20 and its transport-carriage chassis 28 corresponding to the section and the exemplary embodiment according to FIG. 3. FIGS. 6B to 6F show different exemplary embodiments of shielding means 88.

FIG. 6B shows shielding means 88 in the form of an imbricated seal 90 in which a plurality of sealing lamellae 92 are arranged overlapping in the longitudinal direction of the drying tunnel 70 such that they cover the connecting passage 78 at the tunnel floor 76. The sealing lamellae 92 are manufactured in practice from a bendable sheet metal or a temperature-resistant bendable plastics material. When the transport carriage 20 moves into the dryer 16, the jointed struts 38, 40 arrive in the connecting passage 78 and press the sealing lamellae 92 out of the way in a manner known per se so that there is only ever a small through-window for tunnel atmosphere in the region of the jointed struts 38, 40. As a result of the imbricated seal 90, it is possible, over the entire length of the tunnel 70, to at least lessen the effect of thermal radiation and/or tunnel atmosphere exiting downwards into the driving space 80. The shielding means 88 therefore form a sealing device 94.

FIG. 6C shows an exemplary embodiment in which the shielding means 88 only act locally in the region of the drive motors 48.1, 48.2 of the transport carriages 20. To this end, the shielding means 88 comprise two rails 96a, 96b having a C-shaped cross section, which flank the connecting passage 78 on the side of the tunnel floor 76 which faces the driving space 80, so that their open sides face one another. The shielding means 88 moreover comprise, at each jointed strut 38, 40, a shielding collar 98 which is formed to be complementary to the rails 96a, 96b. The shielding collars 98 are arranged above the drive motors 48.1, 48.2 and substantially cover these so that the drive motors 48.1, 48.2 are protected at least against thermal radiation from the drying tunnel 70. As they move into the dryer 16, the shielding collars 98 at the jointed struts 38, 40 are guided into the rails 96a, 96b so that a type of labyrinth seal is formed at the regions in which the shielding collars 98 engage in the rails 96a, 96b.

If the routing in the dryer 16 is conceived only for linear travel, the shielding collars 98 can be formed longer in the longitudinal direction of the drying tunnel 70 than transversely thereto. If curved travel in the dryer 16 is intended, the shielding collars 98 are conceived as a circular disk.

FIG. 6D shows a further exemplary embodiment, in which the shielding means 88 only act locally for the region of the drive motors 48.1, 48.2 of the transport carriages 20. To this end, the shielding means 88 comprise two contact strips 100a, 100b, which flank the connecting passage 78 on the side of the tunnel floor 76 which faces the driving space 80. The shielding means 88 moreover comprise, at each jointed strut 38, 40, a contact collar 102 which is formed to be complementary to the contact strips 100a, 100b and can press against these from below when the transport-carriage chassis 28 is located in the driving space 80. The contact collars 102 are arranged above the drive motors 48.1, 48.2 and substantially cover these so that the drive motors 48.1, 48.2 are protected at least against thermal radiation from the drying tunnel 70.

FIG. 6E, on the other hand, again shows an exemplary embodiment in which the shielding means 88 form a sealing device 94, which, over the entire length of the drying tunnel 70, can at least lessen the effect of thermal radiation and/or tunnel atmosphere exiting downwards into the driving space 80. On the side of the tunnel floor 76 which faces the drying tunnel 70, nozzles 104, 104b are arranged there, which flank the connecting passage 78 on both sides. There is a plurality of nozzles 104a and 104b in each case, which are arranged at regular spacings along the connecting passage 78. A separating fluid from a fluid source (not shown specifically), e.g. air or an inert gas, is blown through the nozzles 104a, 104b into the drying tunnel 70 above the connecting passage 78, whereby a type of air seal is formed at the connecting passage 78. The exit openings of the nozzles 104a, 104b are aligned here such that the separating fluid is blown into the drying tunnel 70 with an upward flow component. In modifications which are not shown specifically, the exit openings can also be otherwise aligned. For example, more favorable flow conditions can be present at the connecting passage 78 if the opposing exit openings of the nozzles 104a, 104b are aligned horizontally.

FIG. 6F shows a further exemplary embodiment, in which the shielding means 88 form a sealing device 94 which acts over the entire length of the drying tunnel 70. In this, brushes 106a, 106b and 108a, 108b are arranged on the tunnel floor 76, both on the side facing the drying tunnel 70 and on the side facing the driving space 80, which brushes face towards one another at the connecting passage 78 and cover the connecting passage 78. The brushes 106a, 106b, 108a, 108b encompass the connecting device 36 of the transport carriage 20, i.e. the jointed struts 38, 40 in the present case, when the transport carriage 20 moves through the dryer 16.

As a result of the fact that the transport carriages 20 present can be driven and moved independently of one another and independently of other drive devices, the operation of the dryer 16 and the manner of the guidance and the dwell time of the workpieces 12 can be matched individually to the objects 12 to be dried. This is illustrated in FIGS. 7 to 11, in which various portions of the drying tunnel 70 are shown.

FIGS. 7 to 11 illustrate a dryer concept which is known per se and in which hot and pre-conditioned air is blown into the drying tunnel 70 from air chambers 110 which are accommodated on both sides of the drying tunnel 70 in the housing 68. To this end, the air chambers 110 and the drying tunnel 70 are separated by intermediate walls 112 in which corresponding air openings are present, which are not shown specifically here.

FIG. 7 shows a drying tunnel portion 114 in a conventional operation, in which the vehicle bodies 18 are moved through the drying tunnel 70 whilst maintaining the same spacings and at the same speed. In this case, the throughputs are the same at the entry side and the exit side of the dryer 16.

If difficulties with a treatment upstream of the drying procedure result in delays or interruptions, it may no longer be possible to continuously maintain the throughput at the entry side. FIG. 8 shows such a situation. In this case, successive transport carriages 20 can be moved at different spacings through the drying tunnel 70 since the transport carriages 20 can be moved independently of one another. This can also take place intentionally, without there being a discontinuous supply at the dryer entry. The vehicle bodies 18 can be moved through the dryer 16 in an individually clocked or continuous manner with varying dwell times and at varying speeds. For example, different dwell times can be necessary depending on the coating material to be dried and/or the type of vehicle body 18; for example, in the latter case, high-mass vehicle bodies 18 can necessitate a longer dwell time in the dryer 16 than vehicle bodies 18 which have a comparatively low mass. An inflow and outflow of vehicle bodies 18 which is matched to this is possible since the transport carriages 20 can be moved individually and independently of one another.

FIG. 9 illustrates a drying tunnel portion 116 having an integrated secondary zone 118, in which a secondary line 120 branches off from a primary line 124 in a primary zone 126 in the drying tunnel 70 via switches 122 for the supporting rail 24 in the driving space 80. To this end, the connecting passage 78 branches accordingly in the switch region. The switches 118 can be formed for example as switching points which are known per se. The transport carriages 20 can move successively over the switches 122 there into the secondary line 120. The secondary zone 118 can serve for example as a buffer for vehicle bodies 18 which require a longer dwell time. If these vehicle bodies in the secondary zone 118 move more slowly than the vehicle bodies 18 in the primary zone 126, they are, as it were, overtaken by the latter in the drying tunnel 70 and then guided into the primary section 124 again at the end of the secondary section 120.

FIG. 10 illustrates a branching portion 128 of the drying tunnel 70 into two drying tunnel arms 70a, 70b. A corresponding switch 122 for the supporting rail 24 is also present here in the driving space 80 and the connecting passage 78 branches accordingly. Different tunnel arms can be favorable for example when different vehicle bodies 18 require varying drying parameters and have to be subjected to varying temperatures, for example. One of the drying tunnel arms 70a, 70b can also be formed as a dead end for this purpose. Until reaching the branch, all the vehicle bodies 18 are pre-heated using uniform parameters to then be dried in the specific drying tunnel arm 70a or 70b under defined conditions in each case.

Figure 11:
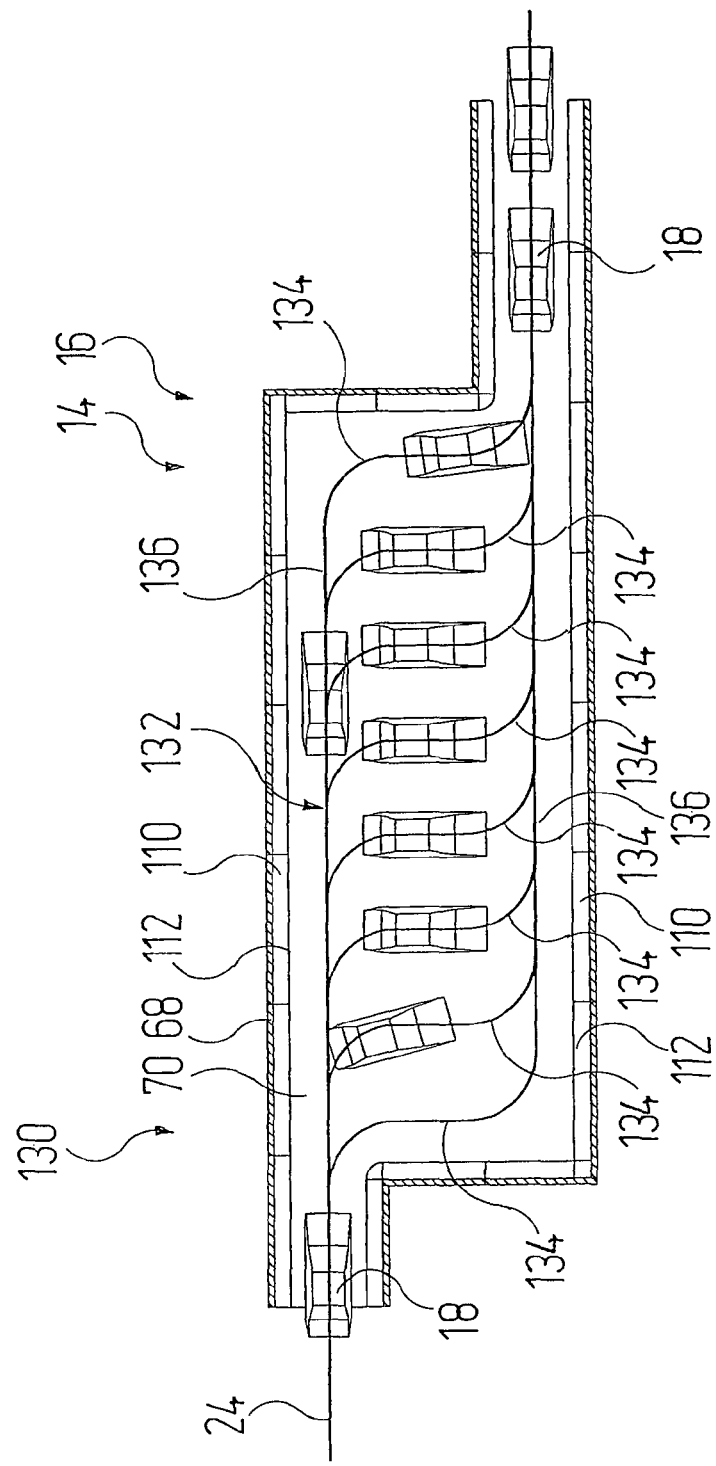
FIG. 11 a schematic plan view of a portion of the dryer which comprises a buffer arrangement.

FIG. 11 illustrates a drying zone 130 having a buffer arrangement 132, in which a plurality of parallel secondary lines 134 are present, which are connected to two primary lines 136 via switches 122. To improve the air guidance, further air chambers 106 or other air outlets can be provided between the secondary lines 134. For instance, vehicle bodies 18 can be parked, as it were, on the secondary lines 134 if they require a particularly long dwell time in the dryer 16, for example.

As can be seen in particular with reference to FIGS. 9 and 11, the drying tunnel 70 in the transport system 20 described can be widened in the transport direction 30 and the floor area of the drying tunnel 70 can be increased transversely to the transport direction 30 so that more vehicle bodies 18 can be received in the transport direction 30 than is the case without such a widening of the drying tunnel 70. As a result, the outer surface determined by the outer walls of the dryer 16 is decreased in relation to the accommodated vehicle bodies 18 so that the thermal losses via the outer walls are reduced relative to the number of vehicle bodies 18.

An alteration to the floor area of the drying tunnel 70 compared to known linear throughput dryers can be realized on the one hand by a branched routing as illustrated in FIGS. 9 and 11. On the other hand, as described above, the transport carriages 20 are able to negotiate curves, and can therefore also be conveyed along curves through the drying tunnel 70 without branching. The transport carriages 20 here can be moved for example in a meandering manner. The transport tunnel 70 can also provide a change in direction and extend at an angle or in an arc. Changes in direction in the drying tunnel 70 are therefore always possible, even when the transport carriages 20 are moving continuously in the transport direction 30.

On the whole, the geometry of the drying tunnel 70 can therefore be selected in substantially any desired manner and adapted to the local conditions.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A temperature control device for controlling the temperature of workpieces comprising:
 a) a housing;
 b) a temperature control tunnel which is accommodated in the housing and has a tunnel floor, the tunnel floor having a connecting passage, wherein a driving space is arranged below the tunnel floor, wherein the connecting passage is covered by a plurality of sealing lamellae which are flexible;
 c) a transport system, which comprises a rail system arranged in the driving space and a plurality of transport carriages which can be moved in a transport direction on the rail system and by means of which workpieces can be transported through the temperature control tunnel, wherein each transport carriage comprises a transport-carriage chassis and a securing device for at least one workpiece, which are coupled to one another by a connecting device,
 wherein
 d) the plurality of transport carriages each carry along a separate drive system so that the plurality of transport carriages can be driven and moved independently of one another.

2. A temperature control device as claimed in claim 1, wherein the tunnel floor has a connecting passage, and a driving space, arranged below the temperature control tunnel, is available for the transport-carriage chassis such that the transport-carriage chassis can be moved in the driving space, wherein the securing device is carried along in the temperature control tunnel and the connecting device extends through the connecting passage.

3. The temperature control device as claimed in claim 1, wherein each drive system comprises at least one drive roller, which is supported by the transport-carriage chassis and can roll along a drive running surface of the rail system, and comprises at least one drive motor for the at least one drive roller, which is carried along by the transport-carriage chassis.

4. The temperature control device as claimed in claim 3, wherein each transport carriage carries along a self-sufficient energy supply device by means of which the at least one drive motor can be supplied with energy.

5. The temperature control device as claimed in claim 4, wherein the self-sufficient energy supply device comprises at least one rechargeable energy store.

6. The temperature control device as claimed in claim 1, wherein the connecting passage is linear or angled.

7. The temperature control device as claimed in claim 1, wherein shielding means are provided, by means of which the contact at least between the transport-carriage chassis and the tunnel atmosphere through the connecting passage is at least lessened.

8. The temperature control device as claimed in claim 1, wherein each transport-carriage chassis comprises a leading unit running in front in the transport direction and a following unit running behind the transport direction.

9. The temperature control device as claimed in claim 8, wherein the connecting device comprises at least two vertical jointed struts, which couple the leading unit and the following unit to the securing device.

10. The temperature control device as claimed in claim 1 wherein the drive system of each transport carriage from the plurality of transport carriages is positioned in the driving space and is connected to the connecting device, the connecting device causing the plurality of sealing lamellae to move as the drive system moves the transport carriage through the temperature control tunnel.

* * * * *